United States Patent [19]

Hanson

[11] Patent Number: 5,322,991
[45] Date of Patent: * Jun. 21, 1994

[54] COMPACT HAND-HELD RF DATA TERMINAL

[75] Inventor: George E. Hanson, Cedar Rapids, Iowa

[73] Assignee: Norand Corporation, Cedar Rapids, Iowa

[*] Notice: The portion of the term of this patent subsequent to Jun. 8, 2010 has been disclaimed.

[21] Appl. No.: 22,577

[22] Filed: Feb. 23, 1993

Related U.S. Application Data

[63] Continuation of Ser. No. 426,135, Oct. 24, 1989, Pat. No. 5,218,188.

[51] Int. Cl.⁵ .............................. G06K 7/10
[52] U.S. Cl. .................. 235/472; 235/375; 235/380
[58] Field of Search ............ 235/472, 375, 492, 380

[56] References Cited

U.S. PATENT DOCUMENTS

| | | | |
|---|---|---|---|
| 3,826,900 | 7/1974 | Moellering | 235/472 |
| 4,415,065 | 11/1983 | Sandstedt | 235/472 |
| 4,571,595 | 2/1986 | Phillips et al. | |
| 4,577,195 | 3/1986 | Schwanitz et al. | |
| 4,628,193 | 12/1986 | Blum | 235/472 |
| 4,740,794 | 4/1988 | Phillips et al. | |
| 4,833,726 | 5/1989 | Shinoda et al. | |
| 4,857,716 | 8/1989 | Gombrich | 235/472 |
| 4,906,830 | 3/1990 | Hasegawa | 235/472 |
| 4,916,441 | 4/1990 | Gombrich | 235/472 |
| 4,916,441 | 4/1990 | Gombrich | 235/472 |
| 4,950,009 | 7/1990 | Zook et al. | 235/472 |
| 4,958,382 | 9/1990 | Imanishi | |
| 5,142,700 | 8/1992 | Reed | |
| 5,189,291 | 2/1993 | Siemiatkowski | 235/472 |

*Primary Examiner*—Harold Pitts
*Attorney, Agent, or Firm*—McAndrews, Held & Malloy, Ltd.

[57] ABSTRACT

A compact, hand-held data terminal includes a data display and an alpha-numeric keyboard and a bar code reader provision for manual data entry. The data terminal further includes an RS 232-C data interface for downloading accumulated data into a central computer. The data terminal further includes a transceiver module which provides for an RF communications link to a central computer. An antenna for the transceiver module is contained within the a lower portion of the housing of the data terminal along side walls of a battery compartment. In operation, the data terminal may be inserted into a data transfer cradle coupled to data processing equipment, thereby coupling the data processing equipment via the RF link to the central computer.

14 Claims, 4 Drawing Sheets

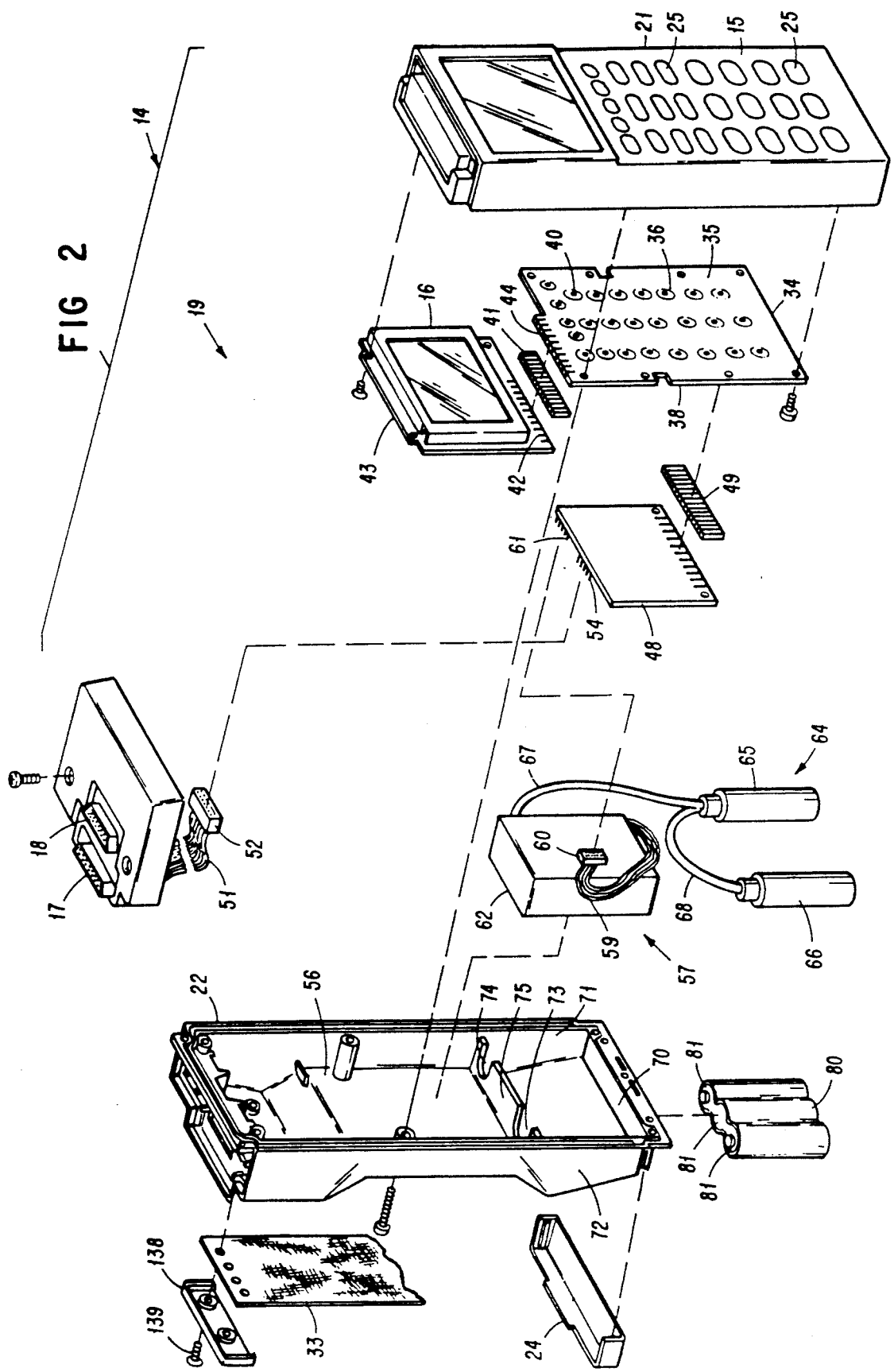

COMPACT HAND-HELD RF DATA TERMINAL

CROSS REFERENCE TO RELATED APPLICATIONS

This is a continuation of co-pending prior application for patent by George E. Hanson, U.S. Ser. No. 07/426,135, filed on Oct. 24, 1989, for "COMPACT HAND-HELD RF DATA TERMINAL," now U.S. Pat. No. 5,218,188.

BACKGROUND OF THE INVENTION

1. Field of the Invention

The invention relates generally to the field of communications and also and more particularly to communication systems including portable, hand-held transceiver terminals.

2. Description of Related Art

In the past, users of computer-supported data processing systems typically were restrained by limited availability or a lack of devices for conveniently interacting with existing computer systems. During changes from existing bookkeeping or accounting systems to computer systems to existing bookkeeping or accounting systems procedural changes were typically minimized. Consequently, conventional data entry procedures usually remained in effect. Adherence to existing procedures with the concurrent use of computer systems did in many instances impede the effective implementation of computer systems. For example, in commercial activities which traditionally relied on written logs or records, the practice of making written records and transcribing the records to electronic, computer-maintained data bases typically continued without recognition that an unnecessary duplication of efforts was involved. The duplication occurred by initially generating written records as it had been done in the past, and then transcribing the written records to electronic data bases. Efforts to make computers more accessible have in the more recent past resulted in the development of portable data terminals which interface with computers.

Two types of portable data terminals have found considerable use in commercial systems relating to merchandise delivery, warehousing and inventory keeping systems. Both types of data terminals are portable. They characteristically include portable power sources of sufficient storage capacity to power the respective terminals over the entire length of contemplated working periods. The working periods may constitute the length of a normal working day or an even longer period.

A first type of data terminal is found to be particularly adaptable to the generation of delivery records or customer invoices, such as those typically generated in delivery route operations. A strength or desirable feature of the first type of terminal is that it is self-contained. A delivery route driver typically carries the terminal with him on the delivery route, such route could conceivably include many stops. The stops may be planned to be made in predetermined order, or at other times they may be chosen at random. Variable modes of usage and application need to be served by terminal-resident recording and processing circuits. Because of the self-contained mode of operation of the first type data terminal, typically, a substantial portion of available housing space is taken up with memory boards. Memory space is needed in form of random access memory circuits for storing data, and also as preprogrammed circuits for routine functions which minimize the work effort by a driver or delivery man and make the terminal a time saver. Data stored in such first type of terminal are typically transferred or "down loaded" to a central computer in a batch transaction after the delivery trip has been completed.

The second type of portable terminal is adapted for use in warehouses or in merchandizing establishments to generate, for example, real time inventory records. In distinction over the first type of terminal, usage requirements of the second type of terminal typically involve handling or recording an even greater number of data, typically relating to merchandise items. Also in contrast to the first type of terminal, the need for mobility of the second type terminal differs by nature of the application. Typically, the second type terminal needs to be fully operational only within the confines of a designated, restricted area, such as a stockroom of a merchandise building, or within a somewhat larger area of a warehouse. In such a relatively restricted space, a data terminal is ideally equipped with a typical RF transceiver to communicate via a base transceiver station with a central computer.

The second type terminal, instead of having a large electronic memory or a substantial circuit section with pre-programmed functions, consequently need include only a minimum of memory and pre-programmed functions in addition to such a transceiver circuit. Typically a predetermined number of the transceiver-equipped data terminals are coupled by means of a multiplexing scheme through the base transceiver station to the same central computer. A distinct advantage of such RF-coupled communication link is that a comparatively light and small, hand-held terminal possesses a data processing power and data storage capacity which is limited only by the power and capacity of a central computer to Which it is communicatively connected. Another advantage of direct, interactive communication between the hand-held terminal and the computer is that data files of the central computer are updated on a real time basis and that each additional terminal coupled to the same central computer has the benefit of the most up-to-date information.

The two types of hand-held data terminals have developed in parallel and are distinct in design in spite of some similarities. One outward and immediately apparent distinction, in many cases, between the two types of data terminals is the presence of antennae on transceiver type of terminals. Until recently, all transceiver type of data terminals have featured such antennae. Only recently some hand held units have been marketed with internally located antennae, such as a hand set of a cordless telephone or a commercial data terminal manufactured by Motorola, for example. Using conventional transceiver type data terminals brings the realization of the inconvenience caused by the presence of the antennae. The extending antennae are easily damaged or broken off. Even flexible type antennae are damaged, when they are accidentally jammed against a wall in a crowded stock room or when they are carelessly used as a carrying handle. In spite of such shortcomings of external antennae, to maintain optimum transmission ranges, the use of external antennae has prevailed in most instances.

Where it does become desirable to eliminate external antennae, and particularly in those applications where the transmission range may not be decreased by relocating the antennae to within the housing of the hand-held terminal, the size of the hand-held terminal is apt to increase accordingly. In short range devices for voice communication, rather than for data communication, such as a handset of a cordless telephone, the use of untuned antennae in the form of a single wire looped within the housing of the handset has been used to eliminate the external antenna without increase of the size of the handset. For interactive data terminals, on the other hand, the use of tuned antennae for accuracy in data transmission becomes desirable. Thus, data terminals in most cases are still using conventional external antennae which may be tuned to optimize their performance.

In addition to the above-mentioned disadvantages of external antennae, the existence of external antennae is an external, physical distinction of the second type of portable terminal with respect to the first type to cause certain undesirable incompatibilities between the two type terminals. It would be desirable, for example, to use the same peripheral devices, such as printers, for both types of terminals. The presence of the antennae typically cause physical interference, particularly when connector cradles are provided to establish the connection to the peripherals. In those instances, the antennae typically interfere with the attachment of such peripheral devices to the terminals. One solution to the latter problem is to provide special connectors to eliminate such interference. This solution is cumbersome and undesirable in most instances.

SUMMARY OF THE INVENTION

The present invention seeks to overcome incompatibilities between the discussed first and second type portable data terminals by a portable, hand-held transceiver type data terminal of the second type having an external configuration in size, shape and appearance substantially identical to a hand-held data terminal of a first type with the capability of batch mode data transfer to a central computer.

According to one broad aspect of the invention, a compact hand-held terminal of such second type includes a housing with a keyboard in a front face to manually enter data. A display terminal is coupled to the keyboard The terminal further includes electrical contacts mounted in the housing and connected to circuits within the terminal to permit the transfer of data directly through the contacts between the terminal and external peripheral devices. A transceiver module mounted within the housing is coupled to control circuits and has the ability to communicate via an antenna located within the housing.

In another aspect of the invention, the internal antenna includes a helical radiating element disposed at the periphery of a battery compartment of the data terminal. The helical radiating element may be comprised of two helical elements located at opposite sides of the battery within the housing, and as such at peripheral edges of a ground plane formed on a circuit board supporting the control circuits of the data terminal.

In one aspect of the invention, the electrical contacts of the data terminal include a communications connector capable of being coupled to a printer. Such communications connector is in a preferred embodiment of the invention disposed on at least one end of the housing, and the data terminal is adapted to be inserted into a cradle including a connector mating with the connector of the data terminal. In accordance with another aspect of the invention, the data terminal includes a second connector, and a bar code reader releasably connected to the data terminal via said second connector. The bar code reader is thereby releasably coupled to control circuits of the data terminal. The bar code reader may be removed when the data terminal is to be inserted into said cradle for coupling the data terminal to said peripheral device.

A particular advantage of the invention is the compatibility of the data terminal with existing peripheral devices, such as printers for use with portable data terminals which do not include transceivers for RF communications with a host computer.

Another advantage of the invention as described herein after is that the location of the antenna within the housing of the data terminal permits the data terminal to be inserted into a standard, available cradle to couple the data terminal to standard data and power contacts of peripheral devices, as are currently available to the data terminal of the first type.

A particular advantage may be realized by the invention described herein upon connection of the data terminal to a standard data transfer cradle for data terminals without RF communications capabilities. Such data transfer cradles are connected to host computers for receiving in a direct data transfer mode data from such data terminals without RF communication capabilities. In connecting the data terminal in accordance with the invention to such a data transfer cradle, two distinct host computers may be linked via the data terminal for data transfer there between. The use of the data terminal consequently not only meets but surpasses the combined capabilities and advantages of the referred to first and second type data terminals.

These and other of the various features and advantages of the invention will be best understood by the following detailed description of a preferred embodiment of the invention, when read in reference to the appended drawings.

BRIEF DESCRIPTION OF THE DRAWINGS

FIG. 2 is a partially schematic exploded view of the data terminal shown in FIG. 1;

DETAILED DESCRIPTION OF THE INVENTION

Figure 1:
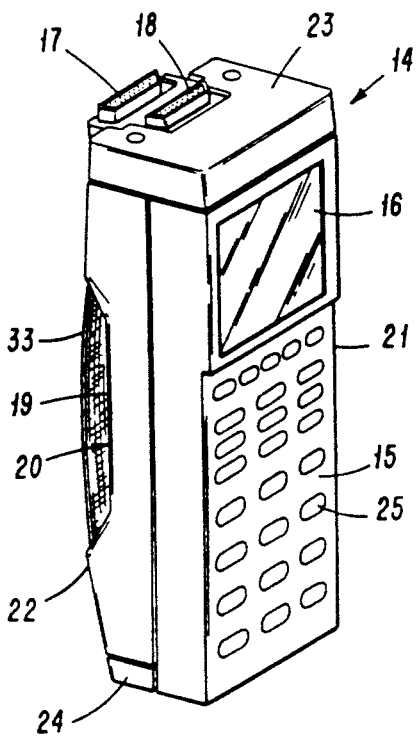
FIG. 1 is a pictorial view of a data terminal which incorporates the features of the present invention.

Referring to FIG. 1, there is shown a pictorial representation of a portable hand-held data terminal which is designated generally by the numeral 14. In particular, FIG. 1 identifies externally located Working components, such as a keyboard 15, an alphanumerical display 16 and two connectors 17 and 18, respectively.

The described components 15, 16, 17 and 18 are located in an elongate enclosure or housing 19 which is of a size and includes such rounded contours 20 so as to conveniently fit into an open palm of a person intending to use the data terminal. The housing 19 may be comprised of a number of shell portions or components to facilitate the assembly of the data terminal 14. Thus, for a currently preferred embodiment of the invention, the housing may include front and rear shells 21 and 22, respectively, a top cap 23 and a battery compartment cap also referred to as bottom cap 24. All of the referred-to shell portions of the housing 19 are preferably of a typical thermo-plastic molding material, such as commercially available material referred to as ABS plastic.

Again in reference to FIG. 1, the front shell 21 of the housing 19 supports and externally features the keyboard 15. Typically size limitations imposed by the portability of the data terminal 14 and a need for a practical size for keys 25 do not permit a large number of the keys to be incorporated into the front shell 21. In the preferred embodiment the keyboard 15 is optionally provided with either twenty-three or forty keys. The keys 25 are alpha-numerical, meaning that characters of the alphabet as well as numerical characters of data can be entered via the keyboard 15 to be encoded in typical electronic data formats.

The display 16 is also adapted to display alphabetical and numerical characters in combination to form typical character messages. In the preferred embodiment of the invention, the display 16 is a liquid crystal display (LCD) providing sixteen lines of display, each line having a twenty character capacity. The number of lines on the display 16 or the number of characters which can be displayed on each line is, of course, a matter of preference and choice. Thus, an alternate embodiment of the invention contemplates a display 16 having only four lines of characters.

The top cap 23 of the preferred embodiment shows two connectors 17 and 18. The connector 17 is preferably a multiple pin D-sub type connector which is configured according to a RS-232 C standard of the Electronic Industries Association, and as such a serial-type data transmission connector which may provide connection to peripheral devices which may be similarly configured to offer either one-way or two-way data communication at a data bit rate which cannot exceed 19,200 bits per second.

The location of the connector 17 in the top cap 23 corresponds to the location of the same connector in the first type data terminal, as described in the Background of the Invention. Also, the housing 19 of the data terminal 14 in the preferred embodiment of the invention is in size and shape substantially identical to such terminal of the first type. Thus, from an outward appearance of the data terminal 14, by intent, there are preferably no discernible differences in form when compared to the outward appearance of a data terminal of the first type. The external features and shape of the housing 19 are duplicated including such details as the shape of the rear shell 22 which features the rounded contour 20 fitting the palm of an operator's hand identical to that of the first type data terminal. The conforming shape of the data terminal 14 permits the data terminal 14 to become coupled to, or used in conjunction with, any of a number of peripheral devices which may be or may become available for such other data terminal of the first type.

The top cap 23 is also shown to support a second connector 18. The second connector 18 is intended for a bar code reader 28 (See FIG. 8) to become coupled to the data terminal 14. The use of the bar code reader 28 with prior art terminals having RF interfaces and external type antennae is well known in inventory control operations, for example, wherein such data terminals read and transmit bar code data to update computer data bases on a real time basis. The bar code reader 28 is used to read the bar codes of merchandise items to quickly and with little chance for clerical errors identify the items while the actual count of inventory on hand may be entered via a keyboard, such as the keyboard 15. In the disclosed embodiment of the invention, the connector 18 for the bar code reader 28 is located in the top cap 23 adjacent the RS-232 C connector 17. The bar code reader 28 is physically and electrically coupled through a flexible, coiled cord 29 and a connector 30 to the connector 18.

Figure 9:
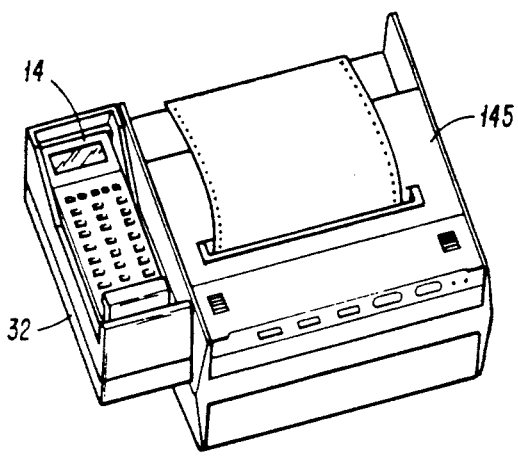
FIG. 9 shows a prior art printer and cradle and the data terminal adapted by features of the present invention to interact with the cradle and printer.

It should be understood, however, that the connector 18 could be located in a different position of the housing 14, in that the currently shown location is one of convenience. It may be preferred to relocate the connector 18 for reasons of compatibility which may become apparent when the use of the data terminal 14 is considered as a whole. For example, the current location of the connector 18 requires the connector 30 of the bar code reader 28 to be disconnected from the connector 18 before the data terminal 14 can be inserted into a cradle 32 as shown in FIG. 9. During typical, hand held operations of the data terminal 14, the currently contemplated position of the connector 18 serves to keep the cord 29 away from the keyboard 15 and the display 16 on the front of the data terminal 14. For such hand-held operation, a hand strap 33, conveniently attached to the rear shell 22 of the housing 19, may be used to prevent an operator from accidentally dropping the data terminal 14. The attachment of the hand strap 33 to the rear shell 22 is better shown in FIGS. 2 and 6.

FIG. 2 shows a partially schematic exploded view of the data terminal 14 to show in greater detail some of the major internal components of the preferred embodiment of the invention. The front shell 21 of the housing 19 contains the keys 25 of the keyboard 15. In accordance with known techniques, a main circuit board 34 has an upper surface 35 which features conductive patterns forming normally open contacts 36. A key depression of one of the keys 25 results in the key 25 conductively bridging a gap of the open contact 36, causing a closure of such contact 36. The correct spacing between the respective keys 25 and contacts 36 becomes established when the circuit board 34 is assembled to the front shell 21. To achieve a compact packing of various circuit components of the data terminal 14, a back surface 38 of the circuit board 34 preferably supports components of a control circuit 39 shown in FIG. 3. Again in reference to FIG. 2, the contacts 36 are coupled to the back surface 38 of the circuit board 34 by conductive through connections, such as indicated at 40.

The display 16 becomes electrically interconnected to the circuit board 34 when the display 16 is assembled to the front shell 21. An electrical connection is made in a conventional manner via a compressible connector block 41. In the assembled data terminal 14 the block 41 is located between respective contacts 42 on a circuit board 43 of the display 16 and their corresponding contacts 44 on the back surface 38 of the circuit board 34. A communications circuit board 48 may be coupled advantageously in a similar manner to the circuit board 34 through an interposed connector block 49. Other connections, such as electrical leads from the connectors 17 and 18 are made through a cable 51 to their respective circuits. The cable 51 is preferably a flat cable. A connector 52 couples individual conductor leads 53 of the cable 51 to respective connector pins 54 on the communications circuit board 48. From the circuit board 48, further connections are made, for example, through the connector block 49 to the main circuit board 34.

A major cavity 56 formed by the rear shell 22 of the housing 19 is adapted to receive a transceiver module 57. The circuit of the transceiver module 57 is a standard transceiver circuit 58, referenced in FIG. 3, which is commercially available for industrial communications applications, for example. The transceiver circuit 58 within the module 57 is mounted on a circuit board, not shown. Control, data and power is communicated to the transceiver through a cable 59 coupled to a connector 60 which connects to respective connector pins 61 on the main circuit board 34. The transceiver is housed in a metal enclosure 62 to provide RF shielding.

An antenna for the transceiver circuit 58 is designated generally by the numeral 64. The antenna includes in a preferred configuration first and second radiating elements 65 and 66. A lead-out from the transceiver circuit 58 to the first radiating element 65 is through a coaxial cable segment 67. The first and second radiating elements 65 and 66 are communicatively coupled through a coaxial linking cable 68. The coaxial cable segment 67 and the linking cable 68 are miniature-type coaxial leads which can be flexed sufficiently to permit a convenient routing path within the housing 19. The radiating antenna elements 65 and 66 are located, one on each side, within a power or battery compartment 70 of the housing 19. The circuits, such as on the communications board 48 and on the circuit board 34 include those conductive elements which represent ground planes and inherently tend to shield against RF signal transmission. The plastic material of the housing is readily penetrated by RF signals. Thus, it appears advantageous to locate the radiating elements 65 and 66 outward from circuitry and other elements that might have a grounding, shielding or signal deteriorating effect on RF signals.

In the preferred embodiment, the radiating element 65 is located adjacent a side wall 71 of the battery compartment 70, while the radiating element 66 is located adjacent a side wall 72 of the battery compartment 70. The coaxial cable segment and link 67 and 68 are routed from the battery compartment 70 through respective antenna apertures 73 and 74 formed in an upper battery compartment partition 75.

The battery compartment 70 is of a dimension to accept five AA-type batteries in parallel alignment. This is the battery configuration of nickel-cadmium rechargable batteries being use in the previously referred-to data terminal of the first type. The preferred embodiment contemplates instead as a self-contained power source for the data terminal 14 a battery pack 80 which is comprised of three lithium type rechargable batteries 81. The preferred batteries, of a AA-type size, provide in series combination a total voltage of nominally between 9.0 and 9.6 volts. This corresponds to the design supply voltage of the data terminal 14. Hence, the change in the battery type and configuration provides for additional space to mount the radiating elements 65 and 66 on each side of the battery compartment 70. The battery pack 80 is insertible between the two radiating elements 65 and 66 within the battery compartment 70.

Figure 6:
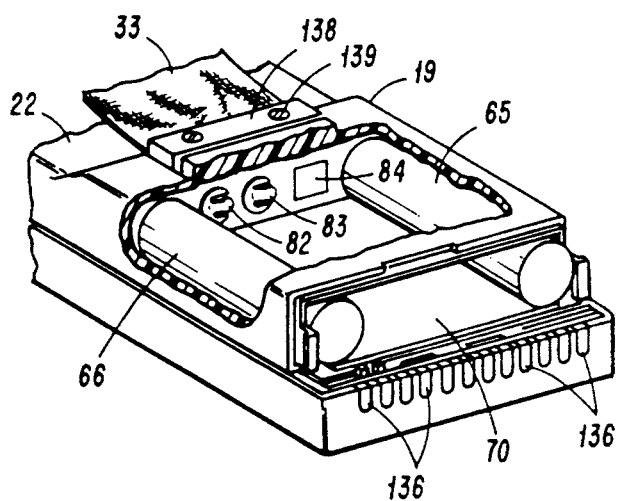
FIG. 6 is a partial view of the lower end of the data terminal with wall portions of the housing broken away to show a battery compartment in greater detail.
Figure 7:
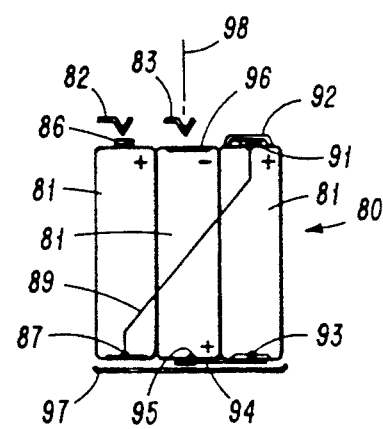
FIG. 7 is a schematic representation of a battery for the data terminal showing a preferred contact arrangement.

FIG. 6 shows the battery compartment 70, partially in section and the battery compartment bottom cap 24 (shown in FIG. 2) having been removed to show the radiating elements 65 and 66 installed. FIG. 6 shows in particular a positive battery contact 82 and a corresponding negative battery contact 83. The two opposite contacts 82 and 83 are preferred to be in two adjacent positions of three possible positions, such that a third position 84 of the three battery positions has no contact. The preferred contact arrangement prevents a possible reversal of the battery pack 80. A preferred arrangement of the batteries in the pack 80 is best explained in reference to FIGS. 6 and 7. FIG. 7 shows schematically a preferred configuration of the battery pack 80 and the contacts 82 and 83 relative thereto. A first one of the three batteries 81 in the pack 80 is oriented with a positive terminal 86 against the positive contact 82. An oppositely outer battery 81 is also oriented in the same direction as the first one of the three batteries 81. A corresponding negative terminal 87 of the first battery 81 has attached thereto one end of a conductive cross strap 89. The other end of the strap 89 is attached to a positive terminal 91 of the oppositely outer battery 81 of the pack 80. An insulating shield 92 preferably caps the positive terminal 91. A corresponding negative terminal 93 of such oppositely outer battery 81 is conductively connected by a strap 94 to a positive terminal 95 of the center one of the three batteries 81. The orientation of the center battery is reversed with respect to the orientation of the other two batteries 81, such that positive and negative terminals 95 and 96 of the center battery are reversed with respect the respective terminals of the outer batteries of the pack 80. Thus, the negative terminal 96 of the center battery contacts the negative contact 83. The lower contacts 87, 95 and 93 are shielded from external contacts by a lower battery shield 97.

Advantageously, the described structure of the battery pack 80 and the location of the contacts 82 and 83 prevent accidental reversal of the polarity of the battery pack 80. Thus, if the battery pack 80 is accidentally reversed about a centerline 98 through the center battery, the center battery will still contact the negative terminal, while the positive terminal 91 will be adjacent the positive contact 82. However, the shield 92 prevents the terminal 91 from making electrical contact with the contact 82. Should, during the insertion of the battery pack 80 into the battery compartment 70 (See FIG. 6.), the upper and lower terminals become reversed by accident, the shield 97 would prevent the terminals of the battery pack 80 from becoming electrically coupled to the contacts 82 and 83, so that the error becomes immediately apparent without damage to the data terminal or an explosive reaction because of a reversal of the battery pack 80.

Figure 3:
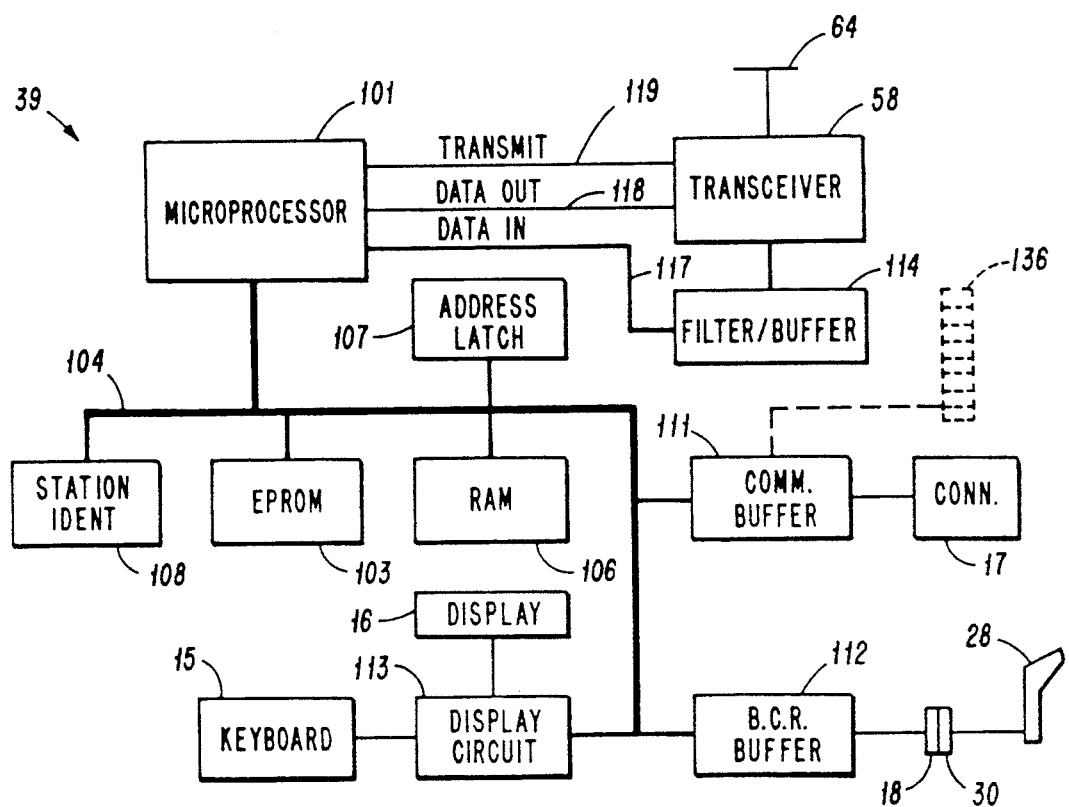
FIG. 3 is a diagrammatic representation of circuit functions controlling the operation of the data terminal shown in FIG. 1.

The schematic block diagram of FIG. 3 illustrates an interaction of functional elements of the terminal's control circuit 39. A major element of the control circuit 39 is a host microprocessor integrated circuit 101. A preferred microprocessor is an 8051 type circuit. The operations of the microprocessor 101 are supported by a number of subcircuits. As is often the case, the control functions for the microprocessor are preferably permanently stored in a Read-Only Memory (ROM) circuit, such as the EPROM 103 which is shown as being coupled to the microprocessor via a data bus 104. A control program stored in the EPROM 103 provides the microprocessor 101 with control sequences and priorities for all contemplated operating functions and subroutines of the data terminal. The microprocessor 101 is consequently a key element not only for controlling all operational modes but also for controlling the manipulation of data which may need to be processed during the operation of the data terminal 14 of FIG. 1 in any of its operational modes.

Still in reference to FIG. 3, the microprocessor 101 consequently receives, stores, retrieves and processes data from external sources as a result of the operation of said data terminal 14. Such data may be stored temporarily in a random access memory (RAM) 106. The RAM 106 is typically used to temporarily store both procedural and substantive data. Procedural data are, for example, address codes, status information on currently active, interactively coupled components or information relating to operating sequences. Substantive data, on the other hand, would be of the type entered via the keyboard 15 or the bar code reader 28, for example.

Other subcircuit functions are supported, for example, by an address latch circuit 107 and a station identifier circuit 108. The address latch 107 locks in the identifier value of a current memory address. The station identifier circuit 108 generates a station identification code which identifies the particular data terminal to a base station 110 (See FIG. 8) when the data terminal 14 is used in a typical multiplexing operation in conjunction with other potentially active data terminals 14.

In one mode of operation of the terminal 14, substantive data may be communicated via a communications circuit 111, referred to in FIG. 3 as COMM BUFFER, and the RS 232 C Connector 17, the combination of which is also referred to as RS 232 C interface or RS 232 port. Data communications through the RS 232 port may be incoming or outgoing data messages communicated in what is commonly known as full or half duplex modes. The bar code reader connector 18 is coupled to a bar code reader buffer circuit 112, which circuit may include code interpretation circuits or may interact with the microprocessor 101 or another microprocessor to interpret and validate data read by the bar code reader 28 before storing them in the RAM 106 or transferring them to a display circuit 113 of the display 16. The display 16 and the display circuit 113 are adapted to receive and display information from the keyboard 15, the bar code reader buffer 112, the communications buffer 111 or from the transceiver 58, as directed by the microprocessor 101. Data received by the transceiver 58 are demodulated by a filter-buffer circuit 114 and are typically directed by the microprocessor to the display circuit 113 to be displayed on the display 16.

Another mode of operation of the data terminal 14 is as real time interactive communication mode with a central computer 115 (as shown generally in FIG. 10.), in which the data terminal 14 receives and transmits data messages through its radio communications link. Such link, as shown schematically in FIG. 3, is comprised of the antenna 64, the transceiver 58, the FILTER/BUFFER circuit 114 and the microprocessor 101. Received data messages pass through the circuit 114 as they are routed to the microprocessor 101 via DATA IN bus 117. The microprocessor 101 is of a type supporting serial transmit-receive functions. Outgoing data messages or serial data streams are applied directly routed via DATA OUT bus 118 from the microprocessor 101 to the transceiver 58. The modulating-demodulating functions of the transceiver circuit 58 prepare the outgoing data messages for transmission via the antenna 64. A third direct signal line between the microprocessor 101 and the transceiver 58 is a TRANSMIT connecting line 119 which has the function of transmitting a handshake signal between the microprocessor 101 and the transceiver 58 to disable transceiver functions. The transceiver functions might, for example, be disabled for the operational mode during which data messages are communicated directly via the communications buffer 111 and the connector 17.

Figure 4:
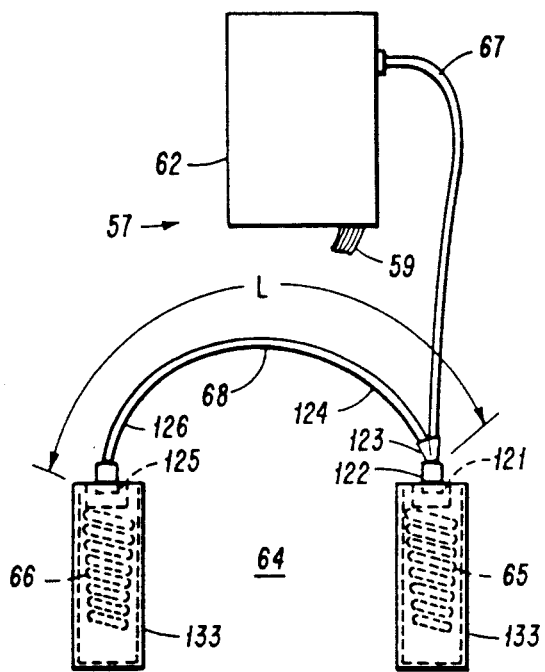
FIG. 4 is a simplified view of a transceiver module and antenna assembly of the data terminal, depicting particular features of the current invention.

The antenna 64 is depicted in greater detail in FIG. 4. In the preferred embodiment the lead-out connection from the transceiver module 57 to the antenna 64, namely the coaxial cable segment 67, is of a convenient length for routing along the inside of the already described housing 19 toward the battery compartment 70 (see FIG. 2, for example.). The cable segment exits at a convenient point from the metal enclosure 62 of the transceiver module 57, preferably somewhat removed from the control, data and power cable 59. The radiating elements 65 and 66 are then mounted along the sides and within the battery compartment 70, as shown in FIG. 6. Still in reference to FIG. 4, the cable segment 67 terminates at a coupling 121 which is a base for the first radiating element 65. At a connection 122 to the coupling 121, a splice 123 couples a first end 124 of the coaxial linking cable 68 to the coaxial cable segment 67. The length "L" of the linking cable 68 between the splice 123 and a coupling base 125 adjacent the second end 126 of the cable 68 is currently preferred to be equal to one-fourth of the wave length of the carrier wave of the RF signals transmitted through the radiating elements 65 and 66. It is believed beneficial in allowing the two radiating elements 65 and 66 to be coupled in parallel without increase in the impedance of the antenna, in that one of the radiating elements will be phasing through peak radiating power when the second radiating element is at a node. A quarter wave length difference at the contemplated radio frequency, contributed by the length "L" of the coaxial linking cable 67 is believed to bring about the desired result. It is, of course, possible to change the length "L" to a different length, such as to a three-fourths wave length delay for a similar result. In the alternative it may be deemed desirable to choose the coaxial cables to be of length from a splitting link, such that the radio transmission wave is simultaneously at a peak or at a node at both of the elements 65 and 66.

Figure 5:
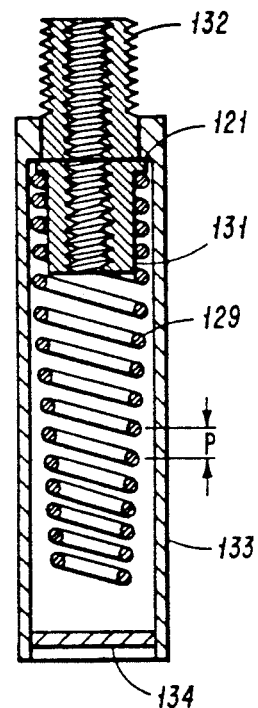
FIG. 5 shows a cross section through a radiating element assembly of the antenna shown in FIG. 4.

In the preferred embodiment, the radiating elements 65 and 66 are identical coiled wire springs 129, the structure of a representative one of which is shown in greater detail in FIG. 5. A preferred material for the springs 129 is copper-plated music wire of 0.05 inch diameter. The uncoiled length of that portion of the music Wire of the spring 129 that extends free beyond the coupling base 121 is chosen to be equal to one-half of the wave length intended to be transmitted by the spring 129 as radiating element 65 or 66. Since it is desired to house the radiating element in the space of a size AA battery, a space constraint exists that the coil of the spring 129 should not exceed 0.4 inch in diameter. The coils for the springs 129 for the radiating elements 65 and 66 preferably have a slight taper with an average diameter of approximately 0.38 inch. With such a diameter, eleven turns of wire are required to coil a length of 12.8 inch of wire. Such length is equal to a half wave length at a nominal transmission frequency of 460 MHz, hence of the frequency range at which the transceiver circuit 58 would be operating. The total length of the wire for the spring 129 is approximately 17 inch, allowing for about three turns of the wire to be coiled onto and fastened to a shoulder 131 of the coupling 121. The wire is preferably soldered to the shoulder 131 to become permanently attached thereto An outer end 132 of the coupling 121 may be threaded as is shown in FIG. 5, and the connection 122 may then be a threaded coaxial connector, or the end 132 may be a smooth-walled and of adapted to receive ends of the coaxial cable segment 67 and the linking cable 68 in a crimped or soldered connection for a permanent attachment of the coaxial link and cable segment to the radiating elements 65 and 66. The coupling 125 is similar to the coupling 121 except for the absence of the splice 123 as shown in FIG. 4.

Preferably, both radiating elements 65 and 66 are encased in a cylindrical plastic housing 133 which is molded about or attached by any other convenient method to the respective couplings 121 and 125 The plastic material chosen for the housing 133 may be the same as that of the front and rear shells 21 and 22, or of any other suitable material which is readily penetrable by RF energy. The outer dimensions of the housing 133 are preferably equal to those of a conventional size AA battery housing. The housing 133 is preferably closed at the end opposite the coupling 121 by a base cap 134 of circular configuration. The base cap lends rigidity to the cylindrical shape of the housing 133. However, as an alternative embodiment the base cap may be omitted, particularly when the cylindrical housing is of such rigidity so as not to risk damage to the wound shape of the radiating element. Each of the turns of the spring 129 is spaced from its adjacent turn at a pitch distance "P" which maximizes the available space in the housing 133 such that the pitch distance is substantially equal between all adjacent turns of the spring 129. Contained by the overall dimensions of the housing 133, the radiating elements 65 and 66 fit into the outermost battery positions of the battery compartment 70 of the housing 19 as shown in FIG. 6.

FIG. 6, showing the lower portion of the housing 19 of the data terminal 14 also shows a plurality of contacts 136. The contacts 136 are molded into the rear shell 21 of the housing 19 and protrude to the outer surface of the housing 19. The contacts 136 include data input-output contacts which within the housing 19 are preferred to be electrically coupled to the COMM BUFFER 111. The schematic diagram in FIG. 3 indicates such arrangement which enables the contacts 136 to serve as an alternate data transfer connection for certain peripheral devices, such as, for example, the data transfer cradle 32 shown in FIG. 9. As such the contacts 136 as well as the connector 17 provide data communications interfaces for the direct transfer of data or control messages by direct transfer through communications cables that may be coupled to the outside of the data terminal 14 via such interfaces. Again in reference to FIG. 6, the lower end of the hand strap 33 is shown attached to the rear shell 22 of the housing 19 by means of a clamping plate 138 and preferably two flat head mounting screws 139. The upper end of the hand strap 33 is similarly attached by means of the clamping plate 138 and the two mounting screws 139, as shown in the exploded view of FIG. 2.

Figure 8:
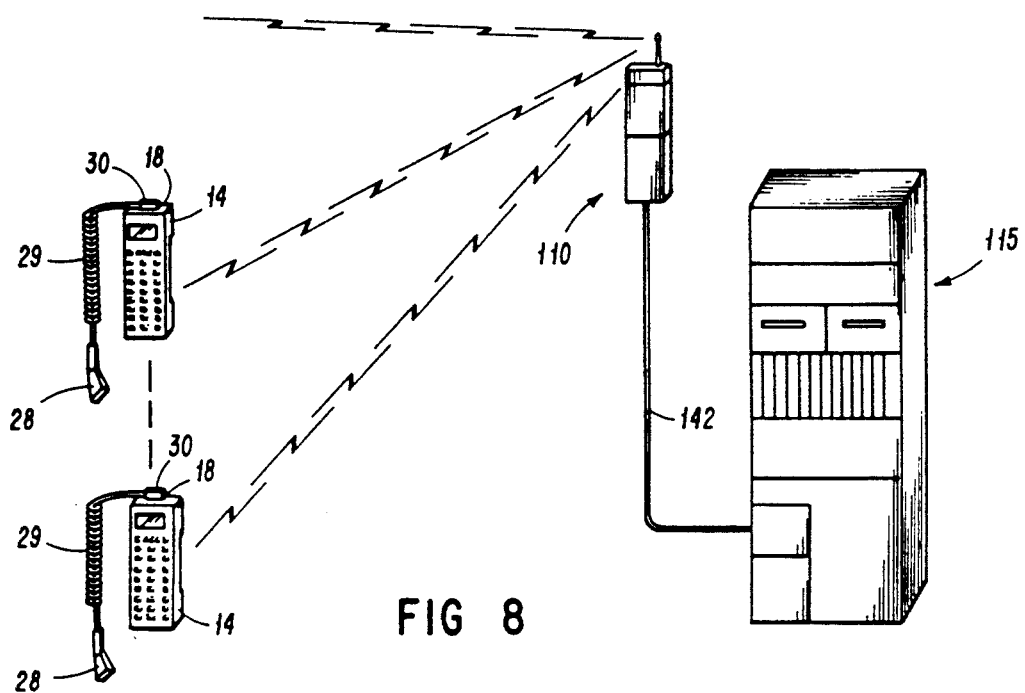
FIG. 8 is a schematic representation of a radio communications system including data terminals of the present invention and showing one of the modes of operation of the data terminal.

One of the modes of operation of the data terminal 14 is best explained in reference to FIG. 8. Typically, a number of the data terminals 14 may be employed in conjunction with one of the transceiver base stations 110. The transceiver base stations are typical commercial stations capable of functioning in a multiplexing mode which allows a number of the data terminals to substantially simultaneously exchange data messages with the transceiver base station 110. The base station 110 may be wall-mounted or otherwise fixedly attached in a store area or warehouse. The transceiver base station 110 may be communicatively coupled from its designated fixed location through a cable 142 to the central computer 115. The computer 115 may be located in an office area remote from the base station 110. When used in typical retailing operations, the computer 115 may also be hard-wired to various cash registers. While the cash registers may transmit inventory depletion data on a real time basis to the computer, the data terminals 14 may be used to enter into the computer 115 existing inventory information or inventory restocking data. In a typically multiplex type operation, each of the data terminals 14 would receive from the computer 115 via the base station 110 uniquely addressed data messages, such that typically only one of the data terminals 14 can decode a respectively addressed message from the computer 115. Also, data encoded by one of the data terminals 14 into data messages and transmitted to the base station 110 are uniquely identifyable by the base station 110 and by the computer, after being routed from the base station through the cable 142, as having been originated by that particular data terminal 14.

In an interactive mode, an operator of one of the terminals may input into the data terminal 14 via the bar code reader typical S.K.U. (Stock Keeping Unit) numbers. The data read into the terminal 14 will appear on the display 16 and will also be temporarily stored in the RAM 106 The operator may then enter additional data via the keyboard 15, such as for example a quantity of the respective stock item which may have just been added to replenish depleted inventory. Upon a command to transmit the data, the data terminal assembles the entered data into a data message and transfers the message to the transceiver circuit 58 for transmission. The base station 110 routinely samples each data terminal 14 and receives the transmitted data message to forward it to the computer 115.

Instead of merely entering data into the computer by radio frequency transmissions, the data terminal 14 is capable of requesting information from the computer and have the information transmitted to appear on the display 16. The data terminal 14 consequently can be programmed to access certain or all data on the computer 115 to have available for its use the computing power of the computer 115. In stock-keeping operations depletion rates and restocking forecasts may be obtained. In retail operations price checks can be obtained on a real time basis.

In a further operational mode of the preferred embodiment, the data terminal 14 may be inserted into the cradle 32 of a printer 145. The cradle 32 uses contacts (not shown) which become coupled to the contacts 136 of the data terminal 14. The cradle 32 connects the data terminal directly, meaning by typical hard-wired connections, to the printer 145 such that the printer can be operated via the keyboard 15. Typically printers such as the referred-to cradle and printer combination have been used with data terminals of the first type for printing order receipts or invoices in delivery route operations. In such operations, the driver enters the order or delivery confirmation and prints a hard copy for the customer's records. The printer 145 is typically capable of being operated from DC supply such as available on a delivery truck.

When the data terminal 14 is inserted into the cradle 32 is possible to power the terminal 14 through power supplied to the printer, such as from the electrical system with which the printer 145 is powered. In such instance it may be possible to recharge the terminal 14 while the terminal is located in the cradle 32.

Figure 10:
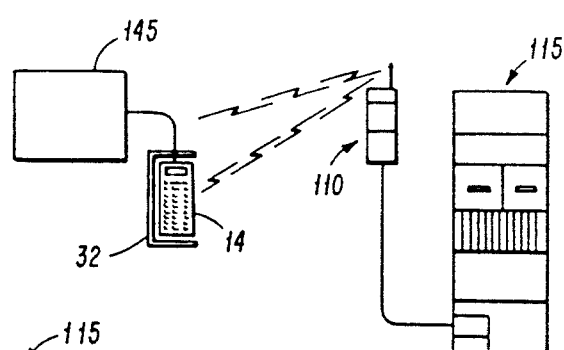
FIG. 10 is a schematic representation of the operation of the data terminal in a radio communication mode between the printer of FIG. 9 and a central computer.

The data terminal 14, when used in combination with the cradle 32 and the printer 145, enables the printer to be used as a portable customer service station in a number of service operation where portability is required and customer receipts need to be printed. In such combinational arrangement, the printer 145 and the data terminal 14 function as a single unit. Moreover, inasmuch as the transceiver 58 is a communications link to the central computer 115, an even more versatile combination is formed. The data terminal 14 inserted into the cradle 32, as shown in FIG. 9, connects the computer 115 to the printer 145 via the radio data link provided by the data terminal 14. The computer 115 has available in its storage peripheral various data files with product, inventory, pricing and customer information. The computer 115 may further be connected through conventional modems and telephone lines to obtain customer credit information. Thus, FIG. 9 shows a portable customer service station with the capability of receiving customer credit card data, charging a customer's account and printing a customer receipt on a completed transaction. FIG. 10 is a schematic representation of the combination of the data terminal 14 inserted into the cradle 32 of the printer 145 interactively communicating with the computer 115 by means of the base station 110.

Figure 11:
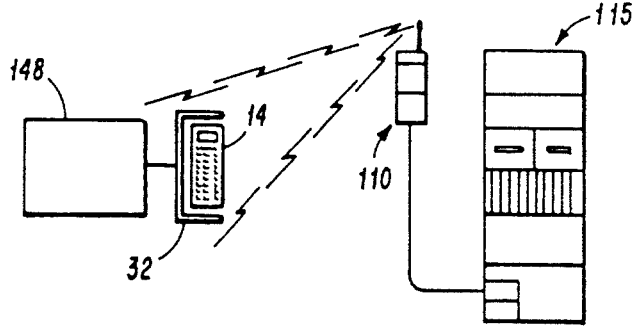
FIG. 11 shows schematically another mode of operation of the data terminal as a coupling link between the central computer and another computer.

FIG. 11 shows a use for the data terminal 14 inserted into the described cradle 32. In the schematic diagram of FIG. 11, the cradle 32 is coupled to a computer 148. The computer 148 may be a portable computer or may be a computer or data terminal which has accumulated a large volume of data over a period of time, but has no direct link to the central computer 115. By inserting the data terminal into the cradle 32, the computer 148 becomes coupled directly to the data terminal 14 and thereby to the central computer 115 via the radio link established by the data terminal 14 and the base station 110. With the setup as shown in FIG. 11, it is possible to download accumulated data from the computer 148 directly to the central computer 115. Also, if the computer 148 is used for operations which require routinely updated information, it is possible to update information by temporarily coupling the data terminal 14 to the cradle 32 of the computer 148 and to download such updated information by radio communication through the data terminal 14 from the central computer 115 to the computer 148.

While the foregoing invention has been described in terms of a specific, preferred embodiment thereof it is to be understood that various changes and modifications can be made in any of a number of way in the described embodiment without departing from the spirit and scope of the invention. This invention is to be defined and limited only by the scope of the claims appended hereto.

What is claimed is:

1. A compact, hand-held data terminal adapted to communicate data in any of at least two communication modes, the terminal comprising:
   a housing at least in part of a material penetrable by RF signals;
   means for manually entering data and a display means communicatively coupled and disposed in a front face of said housing;
   data transfer means having external access and communicatively coupling the data terminal to an adjacent externally located peripheral device upon insertion of the data terminal into a data cradle for transferring data in first local data transfer communication mode between the terminal and externally located peripheral devices;
   a transceiver disposed within said housing;
   a control circuit including means for storing control sequence instructions, means for storing data and means for selectively communicating data between said data storage means, said transceiver and said data transfer means; and
   antenna means located within said housing, said antenna means comprising at least one antenna element coupled to the transceiver and disposed along the side of and within the housing and spaced from the control circuit and the transceiver, whereby the antenna element becomes disposed away from radiation shielding surfaces of the control circuit and the transceiver and remains within the confines of the housing to facilitate the insertion of the data terminal into a data cradle of a peripheral device for communication therewith in the first mode while being capable of communicating via the transceiver and the antenna means in a second, RF communication mode with a further external peripheral device.

2. The compact, hand-held data terminal according to claim 1, wherein the data transfer means comprises a serial-type data interface.

3. The compact, hand-held data terminal according to claim 1, wherein the at least one antenna element comprises a helically wound radiating element having an uncoiled length of one half of a wave length of an operating carrier wave of the transceiver.

4. The compact, hand-held data terminal according to claim 3, wherein the housing includes a compartment for holding a battery and the at least one helically would radiating element is disposed adjacent a battery upon insertion of a battery into the housing.

5. The compact, hand-held data terminal according to claim 3, wherein the at least one radiating element comprises a pair of radiating elements each of which being respectively located along one of two opposite side walls of the housing.

6. A compact, hand-held data terminal of the type having a housing, a keyboard and a display disposed in a face of the housing, input-output data coupler terminations having first externally accessible coupler elements for communicatively coupling the data terminal to adjacent data interfaces of data handling equipment, data processing and control circuit means located within the housing for receiving data from the input-output coupler terminations and from the keyboard and for storing and transferring data to the coupler terminations, and self-contained power means located within a power compartment formed as part of the housing of the data terminal and coupled to the control circuit means for providing operating power to the control circuit means;

a transceiver including an antenna located within the housing, the antenna having at least one radiating element located along at least one edge of the housing of the data terminal, such that the data terminal may be inserted without hindrance from an antenna into a data cradle of a peripheral communication device, the data cradle upon insertion of the data terminal therein establishing data communication between the data terminal and a corresponding peripheral communication device, and circuit means for coupling bar code data to the data processing circuits of the data terminal when the data terminal is operated externally of the data cradle.

7. The compact, hand-held data terminal according to claim 6, wherein upon insertion of the data terminal into a data cradle of a first peripheral communication device, the data terminal becomes communicatively coupled through the data cradle to the corresponding first peripheral communication device, and via the transceiver including the antenna to at least one second peripheral communication device, whereby the data terminal when inserted into a data cradle of the first peripheral communication device is a communication link between the first and second peripheral communication devices.

8. The compact, hand-held data terminal according to claim 6, wherein the at least one radiating element of the antenna is disposed along at least one edge of the power compartment of the housing, the data terminal including shielding surfaces between the at least one radiating element and the data processing and control circuit means.

9. The compact, hand-held data terminal according to claim 6, wherein the at least one radiating element of the antenna comprises two radiating elements disposed along opposite walls of the housing.

10. The compact, hand-held data terminal according to claim 9, wherein the radiating elements of the antenna are disposed along opposite edges of the power compartment of the housing, the data terminal including shielding surfaces between the radiating elements and the data processing and control circuit means.

11. A compact, hand-held data terminal comprising:

a hand-portable housing, a keyboard and a display disposed in a face of the housing, the housing fitting into a data cradle of a first external peripheral device;

data processing and control circuits disposed within the housing and having coupler terminations with data coupler elements accessible externally of the housing, the data coupler elements coupling the data processing and control circuits through the data cradle to the external peripheral data device for data communication therewith;

a transceiver disposed within the housing and communicatively and electrically coupled to the data processing and control circuits;

a power source for providing electrical power to the data processing and control circuits and the transceiver; and an antenna disposed within the housing and coupled to the transceiver, the antenna including at least one radiating element disposed within the confines of the housing and capable of RF signal communication with a second peripheral data device outside of the housing, whereby the data terminal is capable of being inserted into the data cradle without interference by the data cradle to communicate with the first and second peripheral data devices.

12. The compact, hand-held data terminal according to claim 11, wherein the first peripheral data device is a printer, and the second peripheral device is a central computer, and upon insertion of the data terminal into the data cradle of the printer the data terminal communicatively links the central computer to the printer through the coupling elements and the antenna.

13. The compact, hand-held data terminal according to claim 11, wherein the data processing and control circuits include a bar code circuit for processing and controlling bar code data.

14. The compact, hand-held data terminal according to claim 13, wherein the data terminal includes at least one shielding surface for shielding the at least one radiating element from the data processing and control circuits.

* * * * *